(12) United States Patent
Deixler et al.

(10) Patent No.: US 11,540,107 B2
(45) Date of Patent: Dec. 27, 2022

(54) COMMISSIONING METHOD AND APPARATUS WITH CONTROLLED JOINING MODE

(71) Applicant: SIGNIFY HOLDING B.V., Eindhoven (NL)

(72) Inventors: Peter Deixler, Arlington, MA (US); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 237 days.

(21) Appl. No.: 16/969,324

(22) PCT Filed: Feb. 8, 2019

(86) PCT No.: PCT/EP2019/053162
§ 371 (c)(1),
(2) Date: Aug. 12, 2020

(87) PCT Pub. No.: WO2019/154999
PCT Pub. Date: Aug. 15, 2019

(65) Prior Publication Data
US 2021/0051461 A1    Feb. 18, 2021

(30) Foreign Application Priority Data
Feb. 12, 2018    (EP) .................................... 18156208

(51) Int. Cl.
*H04W 4/00* (2018.01)
*H04W 8/00* (2009.01)
*H04W 4/70* (2018.01)
*H04W 4/80* (2018.01)
*H04W 48/02* (2009.01)
*H04W 48/16* (2009.01)
*H04W 84/18* (2009.01)
*H04L 67/52* (2022.01)

(52) U.S. Cl.
CPC ............. *H04W 8/005* (2013.01); *H04L 67/52* (2022.05); *H04W 4/70* (2018.02); *H04W 4/80* (2018.02); *H04W 48/02* (2013.01); *H04W 48/16* (2013.01); *H04W 84/18* (2013.01)

(58) Field of Classification Search
CPC ....... H04W 8/005; H04W 4/70; H04W 48/16; H04W 84/18; H04W 48/02; H04W 4/80; H04L 67/18
USPC .................................................. 370/329, 254
See application file for complete search history.

(56) References Cited

U.S. PATENT DOCUMENTS

| | | | |
|---|---|---|---|
| 8,493,946 B2 * | 7/2013 | Stewart ................. | H04W 8/005 370/328 |
| 9,860,718 B2 * | 1/2018 | Kumar ................... | H04L 63/123 |
| 10,116,501 B2 * | 10/2018 | Erdmann .............. | H04W 24/02 |

(Continued)

FOREIGN PATENT DOCUMENTS

| EP | 2441299 B1 | 1/2016 | |
|---|---|---|---|
| WO | WO-2010023619 A1 * | 3/2010 | ............. H04L 12/24 |
| WO | 2017036848 A1 | 3/2017 | |

*Primary Examiner* — Marceau Milord

(57) ABSTRACT

The present invention relates to commissioning methods and apparatuses which can be used to provide controlled joining optionally combined with automatic joining in a wireless network with either gateway-based or gateway-free layout. Also, it can be combined with centralized control as well as distributed control.

17 Claims, 1 Drawing Sheet

(56) References Cited

U.S. PATENT DOCUMENTS

| | | | |
|---|---|---|---|
| 10,575,159 B2* | 2/2020 | Wang | H04W 48/16 |
| 10,935,942 B2* | 3/2021 | De Vaan | H05B 47/19 |
| 11,050,615 B2* | 6/2021 | Mathews | H04W 76/10 |
| 2010/0080200 A1* | 4/2010 | Stewart | H04W 8/005 |
| | | | 370/338 |
| 2016/0142263 A1 | 5/2016 | Erdmann et al. | |
| 2016/0248629 A1* | 8/2016 | Erdmann | H04L 41/084 |
| 2016/0373917 A1* | 12/2016 | Logue | H04L 12/2809 |
| 2016/0374133 A1* | 12/2016 | Logue | H04W 76/14 |
| 2017/0245351 A1 | 8/2017 | Leinen et al. | |

* cited by examiner

COMMISSIONING METHOD AND APPARATUS WITH CONTROLLED JOINING MODE

CROSS-REFERENCE TO PRIOR APPLICATIONS

This application is the U.S. National Phase application under 35 U.S.C. § 371 of International Application No. PCT/EP2019/053162, filed on Feb. 8, 2019, which claims the benefit of European Patent Application No. 18156208.3, filed on Feb. 12, 2018. These applications are hereby incorporated by reference herein.

FIELD OF THE INVENTION

The invention relates to the field of commissioning of network devices in wireless networks, such as—but not limited to—Zigbee networks or other lighting control networks, for use in various different applications for home, office, retail, hospitality and industry.

BACKGROUND OF THE INVENTION

Zigbee networks are an example of a low-power/low-cost wireless lighting control network which allows multi-hop communication among devices in a mesh topology. Zigbee devices offer reduced power consumption and cost, together with mesh networking capability, which make them suitable for use in large-scale deployments. Examples of application of Zigbee mesh networks include home automation, building automation, retail services, smart energy, and wireless indoor lighting systems.

Zigbee networks are widely used in different applications, such as home, retail, and industry/office. Applications include wireless light switches, lamps, thermostats, various sensors, electrical meters with in-home displays, traffic management systems, and other consumer and industrial equipment that requires short-range low-rate wireless data transfer.

During initial setup, a Zigbee device performs a commissioning procedure to obtain a network key used to encrypt communication between devices in the network. Commissioning is a process in which a new Zigbee network is set up or a new Zigbee device is added to an existing network.

In lighting control networks, both triggered network joining (trigger-based joining) and automatic network joining (auto-joining) are commonly used. Various Zigbee-based systems employ auto-joining, i.e., the devices (when in a factory-new state) will automatically search for and join any open network if they find one. Auto joining has the advantage of being convenient for the user. When he/she adds new lamps or other network devices to the system, all he/she has to do is to make the gateway (e.g. a bridge device) open its Zigbee network and the lamps will automatically join the network and the gateway will be able to control the newly added lamps or other devices.

Auto joining however has disadvantages. In a large building with many hundreds of factory-new lights, the network joining process for 400 nodes may take up to 4 hours. In addition, auto joining can result in factory-new lights to join networks from other rooms, floors and even neighbouring buildings, or other non-lighting control networks rather than joining the network they are supposed to join. Therefore, trigger-based joining (trigger-joining) has been selected in some lighting control networks. When trigger-joining is used, a trigger operation (such as pointing with an infrared pointer, or pressing a button or the like), will make a device start looking for an open network, and join it when it has found one.

It would be desirable to have a flexible commissioning approach where a single device can be made applicable for both types of methods to join a lighting control network. Thereby, product obsolescence can be avoided, since a single product stock can be used for both kinds of applications. At least, it would be desirable to provide a commissioning approach where the auto joining process can be better controlled.

D1 (US 20160248629 A1) is about inter-profile commissioning method and apparatus for a network. It discloses a commissioning apparatus and method for configuring a joining node of a first profile for operation in a network in accordance with a second profile, wherein the commissioning apparatus is arranged to emulate a commissioning process corresponding to the first profile.

D2 (US 20100080200 A1) discloses network devices in a multi-network wireless mesh network environment, which identify themselves as members of the network by receiving a broadcast message from a first mesh network device that has joined the wireless mesh network, and identifying that the broadcast transmission has been received such as by actuating a light, playing a sound, or sending an identifying reply message back to a broadcasting mesh network device.

SUMMARY OF THE INVENTION

It is an object of the present invention to provide a flexible and more effective commissioning approach.

This object is achieved by an apparatus as claimed in claim 1, 2 or 3, by a network device as claimed in claim 9, by a lighting system as claimed in claim 10, by a method as claimed in claim 11, 12 or 13, and by a computer program product as claimed in claim 15.

In a first aspect, a network node is configured to search for and try to join an open network if it has found one, and if the network node has been triggered by a commissioning tool, to send a predetermined message, which indicates a triggered state of the network node. Furthermore, a gateway device or other network node can be configured to apply a trigger-based network joining process, in which a requesting network node is only admitted to the network if the predetermined message has been received, which indicates that the network node has been triggered by the commissioning tool.

Accordingly, in the first aspect, the proposed invention can be advantageously utilized in a gateway-based system by starting a trigger-based joining process from the gateway, which opens the network and then allows controlled and restricted automatic commissioning.

Typically, the predetermined message is sent when the node is triggered, and the joining only succeeds after other devices have received that message. Moreover, it is noted that the suggested process also applies in cases where a device is re-commissioned back into the same network.

In a second aspect, a network node is configured to provide a first network joining mode for searching for and trying to join an open network if one has been found, and if the network node has been triggered by a commissioning tool, sending a predetermined message, which indicates a triggered state of the network node; and to provide a second network joining mode for only admitting another network node to the network if a further predetermined message has been received, which indicates that the other network node has been triggered by a commissioning tool; wherein the network node is further configured to switch from the first network joining mode to the second network joining mode.

Accordingly, in the second aspect, a single network node can be used for both (1) trigger-based joining systems as well as (2) automatic joining systems, so that product obsolescence can be prevented. Thus, a standard network device in a factory-new state may by default autojoin a system using automatic joining, but also has a mechanism to trigger-join a system where trigger-based joining is used and hence can be used in both applications, without the need to configure the device to be in either in an automatic joining mode or in a trigger-based joining mode. Hence, the network node can be used in both control system environments without the need to configure the device to a specific joining mode. Moreover, the network node can be added with a single trigger join command (such as a torchlight or the like).

The wireless network may be a multi-hop network (such as a Zigbee network) or a star-type network (such as a Low Power Wide Area Network (LPWAN).

According to a first option of the second aspect, the network admission control unit may be adapted to directly create and open a new network in response to the receipt of a predetermined command by the network node. This provides the advantage that the network creation process can be started directly, e.g. by the installer, in cases where no network is available yet. The command may be provided via another network (e.g. by a command received via non-Zigbee network (e.g. an Internet Protocol (IP) based network) or via a commissioning tool.

According to a first option of the first aspect or a second option of the second aspect which can be combined with the first option of the second aspect, the predetermined message may be a network-independent message (i.e., a message not constrained to a network which can also be sent/received between devices not on the same network, such as an inter personal area network (InterPAN) message) which is sent at least on the same channel as the network to be joined and which contains some information that can be related to the device sending it. Thereby, the predetermined message can be sent and received between network nodes even if they are not in the same network but on the same channel(s). This message could be sent on multiple channels, e.g., the channels typically used by a lighting system.

It is noted that the wording "predetermined message" does not necessarily imply that it is a separate message. The predetermined message can also be implemented by adding one or more fields in an existing message that is sent by the concerned network node. It could also be implemented as a certain sequence of prior art messages which are sent in a specific manner (e.g. order, time spacing, mapping over channels, transmit power variations, . . . ).

According to a third option of the second aspect which can be combined with the first or second option of the second aspect, the network admission control unit may be adapted to send a command or attribute to an added network node for instructing the added network node to employ the network joining process. This measure serves to ensure that the added network node uses the same network joining process as the network node that opened the network. The command or attribute could be a standard network command or attribute, respectively.

When a node opens a network, it may typically inform, e.g., by default, other nodes already in the network of the method to be applied, e.g., upfront or in a message. Another alternative may be to add some flag to the "open network" command.

If a device which just joined the network has not received any "instructions" from the node that opened the network, it may remember how it joined itself and apply the same logic for the period that the current network is open.

According to a second option of the first aspect or a fourth option of the second aspect, which can be combined with the first option of the first aspect or any one of the first to third options of the second aspect, the network admission control unit may be adapted to admit a network node to the network without receipt of the predetermined message, if a corresponding command dedicated to the network node has been received. Thereby, selected third-party devices which did not send the predetermined message can be admitted as well, e.g., after all own network nodes have been added.

According to a third option of the first aspect or a fifth option of the second aspect, which can be combined with the first and second option of the first aspect or with first to fourth option of the second aspect, the network node may further be configured to create and open a new network, if it has been unable to join into a network after a predetermined time period, or if the trigger has been repeated, or if the trigger is combined with an additional condition, e.g. power cycle.

According to a fourth option of the first aspect or a sixth option of the second aspect, which can be combined with the first to third option of the first aspect or with first to fifth option of the second aspect, the switching from the first network joining mode to the second network joining mode may be performed in response to the receipt of a command or attribute.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, 2 or 3, the network device of claim 9, the lighting system of claim 10, the method of claim 11, 12 or 13, and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a Zigbee lighting network as an example of a wireless network.

Figure 1:
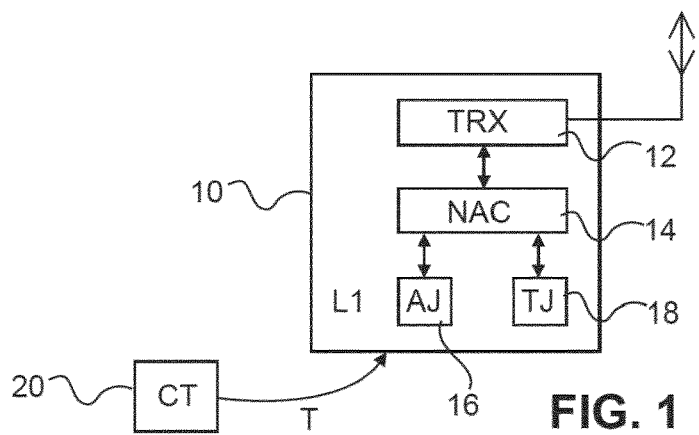
FIG. 1 shows a schematic block diagram of a dual-mode luminaire device for a wireless network, according to a first embodiment.

FIG. 1 shows a schematic block diagram of a Zigbee luminaire device (L1) 10 according to a first embodiment, which can be triggered by a trigger signal T which is generated by an external commissioning device or tool 20. The external commissioning device 20 may be a mobile device such as a flashlight, remote control device, mobile phone, smart phone, tablet, laptop or the like, or even just a button on the luminaire device where the trigger signal T corresponds to a physical action of a user/installer (such as pressing a button), wherein every possible type of physical action or signal connection for transferring a trigger signal for commissioning purposes can be used (e.g. Bluetooth, Infrared (IR), near field communication (NFC), wireless local area communication (Wi-Fi), light etc.).

According to the first embodiment, the luminaire device 10 is configured in a manner so that it can be utilized as a network node in both types of control systems, i.e., in an automatic commission system and in a trigger-based commission system. To achieve this, the luminaire device 10 comprises a network admission control (NAC) function or unit 14 for controlling the commissioning procedure of the luminaire device 10. It can be operated to control admission of the luminaire device 10 to the Zigbee network (not shown) in an automatic joining mode under control of an automatic joining (AJ) function or unit 16 and in a trigger-based joining mode under control of a trigger-based joining (TJ) function or unit 18. Furthermore, a radio frequency (RF) unit 12 with a transceiver (TRX) function is provided for generating RF signals to be wirelessly transmitted/received to/from the Zigbee network.

To add the luminaire device 10 as a network node to the Zigbee lighting network which applies trigger joining, an installer can trigger the luminaire device 10 by emitting the trigger signal T (e.g. an infrared (IR) signal, a BLE signal, a flashlight etc.).

By default, the network admission control unit 14 is set into the automatic joining mode and is controlled by the automatic joining unit 16 to search for an open network.

According to the first embodiment, the automatic joining function 16 controls the network admission control unit 14 to generate and transmit a predetermined message if the trigger signal T has been received from the commissioning tool 20.

As an alternative, the predetermined message could also be sent without involving the network admission control unit 14. A separate unit may then be provided, which is triggered by the trigger signal T and in response thereto generates the predetermined message and forwards it to the transceiver of the RF unit 12.

The predetermined message, which may be an inter personal area network (InterPAN) message on one or more Zigbee channels (i.e. an in-band message), indicates to the network that the luminaire device 10 has been triggered and thus selected for commissioning by the commissioning tool 20. Additionally, a network joining request is generated and sent by network admission control unit 14 to initiate a network joining procedure. The predetermined message and the network joining request can be linked by a corresponding information which identifies the luminaire device 10. Thereby, "devices in the network" are able to link the predetermined message to a joining request of a "joiner". The linking information may be a network address (e.g. Media Access Control (MAC) address), or the joiner may generate a random number and add this number to both messages, or one of the messages may contain a value based on the random number (e.g., with a secret that can be checked by the device in the network but not spoofed by a competitor making "wanna-be" joiner devices). If the predetermined message and the network joining request are combined in a single message the body of this single message may contain some secret information which allows the device in the network to determine whether to allow the joiner on to the network or not.

The predetermined message could be a kind of beacon request or beacon interchange between the joiner and the device in the network, where the device in the network either replies with a beacon (open), if the joiner is allowed, or with a beacon ('closed') or no beacon at all, if the joiner not allowed. The network address (e.g. MAC address) of the requesting joiner may be added to the beacon request. As an alternative, the beacon request and beacon sequence may be followed by an associate request sent by the joiner and the devices in the network (and for which the network is open) will then respond with an association response. In this response, the devices in the network can set a status field in the response to a predetermined value (e.g. 0x01: "PAN at capacity" in case no space is available) or 0x02 "PAN access denied" (in case the joiner is not on the 'list' of devices that have sent the predetermined message and are thus allowed to join). Another alternative for the devices in the network is to just not reply with the association response message at all if the joiner is not on the "list". Thereby, a joiner can be selectively allowed in the network based on a list of devices.

However, if the trigger signal T has not been received, the automatic joining function 16 controls the network admission control unit 14 to generate and transmit solely the network joining request and not the predetermined message.

If the device has not been able to successfully join a network after a certain amount of time (which may be individually set at the luminaire device 10), the network admission control unit 14 may create a network by generating and emitting a corresponding signalling via the RF unit 12 and switch from the automatic joining mode to the trigger-based joining mode (controlled joining method). Now, the trigger-based joining unit 18 controls the network admission control unit 14 to allow potential other devices to join this network.

According to the first embodiment, the trigger-based joining unit 18 is adapted to control the network admission control unit 14 so as to allow a device (e.g. another luminaire device) to join the opened network, only if the predetermined message has already been received from the device.

Thus, according to the first embodiment, the luminaire device 10 can autojoin an open network if the lighting system is employing an autojoin-based joining scheme or can alternatively be used with the trigger-based joining scheme in applicable situations. Thereby, it can be used in both type of control environments.

It is noted that the automatic joining unit 16 and the trigger-based joining unit 18 may be combined in a single joining unit or may be incorporated in the network admission control unit 14. If the luminaire device 10 is configured with a joining capability only, the combined single joining unit may be responsible for controlling (activating) the transmission of the predetermined message when the luminaire device 10 has been triggered.

Figure 2:
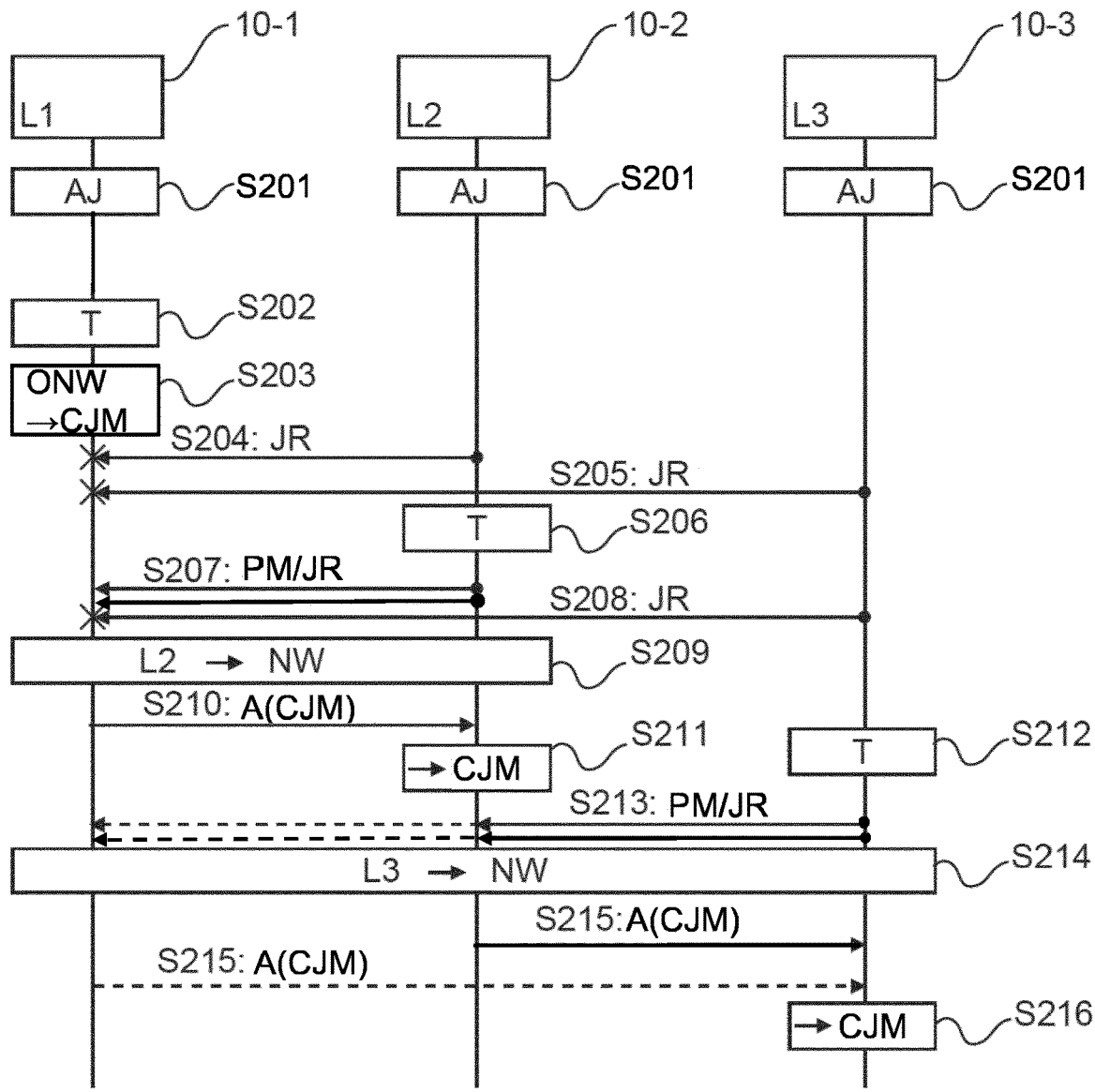
FIG. 2 shows a signaling and processing diagram of a joining procedure according to a second embodiment.

FIG. 2 shows a signaling and processing diagram of a joining procedure according to a second embodiment which involves three luminaire devices (L1-L3) 10-1 to 10-3 to be added to a Zigbee network one after the other. The second embodiment assumes a lighting system where trigger-joining must be applied.

In FIG. 2, horizontal arrows indicate signalling between the luminaire devices 10-1 to 10-2 which are indicated by boxes at the top of the diagrams, and the blocks below the boxes of the respective devices indicate processing steps or procedures of the respective device located above the respective block. The time proceeds in the vertical direction from the top to the bottom of the diagrams. It is noted that some of the messages of FIG. 2 might be sent repeatedly and that the time axis is not to scale.

In the following, a joining procedure according to the second embodiment is described with reference to FIG. 2.

In step S201, when the luminaire devices 10-1 to 10-3 are switched on, they are set by default into the automatic joining (AJ) mode and start transmitting joining requests (not shown in FIG. 1).

Then, in step S202, an installer triggers the first luminaire device (L1) 10-1 with a commissioning tool, e.g., via IR, BLE, simple flashlight to trigger daylight sensor or by pressing a button on the first luminaire device (L1) 10-1. In response thereto, the first luminaire device (L1) 10-1 starts transmitting a predetermined message (e.g. a network-independent message not constrained to the present Zigbee network, such as an InterPAN message, not shown in FIG. 1). When the first luminaire device (L1) 10-1 has not been able to successfully join a network after a certain amount of time, in step S203, the first luminaire device (L1) creates and opens a new network and switches its admission control method to the controlled joining method (CJM) in which a device (e.g. another luminaire device) is only allowed to join the opened network if the predetermined message has already been received from the device.

As an alternative, in step S202, a special or dedicated command may be sent to the first luminaire device (L1) to directly make it start a network and open it without initially searching for an open network.

The other luminaire devices (L2, L3) 10-2, 10-3 are still in the default automatic joining node mode and immediately look for an open network from the moment of power-up. They start trying to join the new network (created by L1) when the first luminaire device (L1) 10-1 opens its network. However, since the second and third luminaire devices (L2, L3) 10-2, 10-3 have not yet been triggered by a commission tool, they both send a conventional joining request (JR) and no predetermined message in respective steps S204 and S205.

When the first luminaire device (L1) 10-1 receives the network joining requests from the other luminaire devices (L2, L3) 10-2, 10-3, it cannot allow them to join its new network, as it is configured to only admit those luminaire devices from which it has received a predetermined message indicating that they have been triggered by the commissioning tool. Since at this stage of the process, none of the other luminaire devices (L2, L3) 10-2, 10-3 has been triggered yet, they are not sending the required predetermined message. In view of this behaviour, other luminaire devices will initially not be allowed to join the network (only after the installer has triggered them). Therefore, they should be configured to allow as many joining attempts as required before being triggered.

In step S206, the installer triggers the second luminaire device (L2) 10-2. The second luminaire device (L2) 10-2 now also sends out in step S207, as a friend-announcement, the predetermined message on the same RF channel as the network started by the first luminaire device (L1) 10-1, and potentially other RF channels typically used by the lighting system. It is noted that the trigger of step S206 can be the same or a different type of trigger than the trigger of step S202. The predetermined message is thus sent as an in-band message. Such in-band messages can be sent and received between Zigbee devices even if they are not in the same network (but on same RF channel). The contents of this message would indicate that it is a device using the controlled joining mode according to the present embodiments.

It is noted that joining request and the predetermined message could be combined into a single message.

The third luminaire device (L3) is however still not triggered by the installer and will thus not yet send a predetermined message at this stage. Therefore, the first luminaire device (L1) 10-1 will prevent the third luminaire device (L3) 10-3 from joining the network (step S208).

The predetermined message (which may contain a unique identification of the second luminaire device (L2) 10-2, e.g., a Zigbee media access control (MAC) address) is then received by the first luminaire device (L1) 10-1, which subsequently allows the second luminaire device (L2) 10-2 to join its network in step S209, recognizing the joining request based on the same unique identification as the received predetermined message (PM).

Once the second luminaire device (L2) 10-2 has joined the network, it will stop sending the predetermined messages. As an alternative, it may be adapted to stop sending the predetermined messages after some time-out after the trigger moment without being added to the network, in order not to waste bandwidth.

Then, in step S210, the first luminaire device (L1) 10-1 sends a command or attribute A to the added second luminaire device (L2) 10-2 to have its admission control method switched in step S211 to the controlled joining method (CJM) of the new network to which it has been added.

As an alternative, the second luminaire device (L2) 10-2 may switch to the controlled joining mode because it joined itself in the controlled joining mode, or may request the current joining method from any of the devices in the network.

Finally, in step S212, the installer also triggers the factory new luminaire device (L3) 10-3. However, it may be out of the radio range of the first luminaire device (L1) 10-1, which means that the first luminaire device (L1) 10-1 might not receive the predetermined message sent by the third luminaire device (L3) 10-3 in step S213, since such predetermined messages are not relayed or forwarded. It is noted that the trigger of step S212 can be the same or a different kind of trigger than the trigger of step S202 or step S206.

However, the network is configured with a distributed joining function, so that all nodes (e.g. luminaire devices) having joined the network are equivalent. Hence, either the first luminaire device (L1) 10-1 or the second luminaire device (L2) 10-2 can admit the factory-new luminaire device (L3) 10-3 to the network (using the same commissioning steps as described above). E.g., if the second luminaire device (L2) 10-2 has received the predetermined message from the third luminaire device (L3) 10-3 in step S213, then it would allow the third luminaire device (L3) 10-3 to join the network (since it has received the predetermined message from the third luminaire device (L3) 10-3 and is also using the controlled joining method), and effectively now all luminaire devices (L1, L2 and L3) 10-1 to 10-3 are on the same network in step S214—even if the first luminaire device (L1) 10-1 might not have received the predetermined message from the third luminaire device (L3) 10-3.

Then, in step S215, the first or second luminaire device (L1 or L2) 10-1 or 10-2 sends the command or attribute A to the added third luminaire device (L3) 10-3 to have its admission control method switched in step S216 to the controlled joining method of the new network to which it has been added.

If the installer works his way across a building, there will very likely always be lights adjacent to the "to be added light" which he just has added in the previous step. Hence the proposed flow is very robust and efficient also for larger scale wireless networks such as an open plan office.

Optionally, an indication of the proposed timeout mechanism may be provided to the installer (e.g., an indication when exactly the first luminaire device (L1) 10-1 decides on the timeout and starts a network of its own, that is, the moment the installer can move on to trigger the second luminaire device (L2) 10-2 and so on). This may be a visual indication if the triggered luminaire device has joined a network and/or if it cannot join a network and hence starts its own network (like after the timeout). Such a visual indication could be dimming down the brightness when the network has been joined or when an own network has been started. Thus, it can be indicated to the installer that a device has joined (e.g. second and third luminaire devices (L2, L3) 10-2 and 10-3 in FIG. 2) or has started a new network (e.g. first luminaire device (L1) in FIG. 2).

If the installer does not want to wait for the timeout (e.g., since he knows that it is the first luminaire of a network), he/she can initiate some special trigger, or send the trigger again.

As a further option, the network could be closed by a timeout (e.g., if no device has joined for certain time) or by another dedicated trigger or the same trigger used for joining to one of the devices in the network with the additional semantics that sending this trigger (possibly repeated or for a longer time to prevent accidental use) to a device already on the network makes it close the network.

It is noted that the first luminaire device (L1) 10-1 but also any of the other luminaire devices (L2, L3) 10-2, 10-3 could actually be a gateway device and not necessarily a luminaire device. Also, there may be other networked devices (e.g. switches, sensors, plugload controllers, etc.) which can be joined in the same way.

Obviously, with the above procedure, it is not possible to add any 3rd party Zigbee device to the network, as they lack both the dedicated behaviour (controlled joining method) described above and do not send the predetermined message required during commissioning. If it is desired to also allow 3rd party Zigbee devices to join the above dedicated network, a dedicated command could be sent by the commissioning tool or via this or another network to the first luminaire device (L1) 10-1 (or another lamp which has joined the network) to also allow devices which are not sending the predetermined message to join the network. This allowance may be limited to a certain manufacturer and/or model as indicated in their characteristics exposed over the Zigbee network (e.g. entertainment feature). Thereby, an installer could first add all the dedicated luminaire devices using the suggested controlled joining method ("point-and-trigger" joining method), and then add some 3rd party devices to the same network. Since those would typically be few, the initially mentioned problem of large numbers of devices trying to join the network all at once would not occur.

However, it is noted that the above luminaire devices (L1, L2, L3) 10-1 to 10-3 can out-of-the-box still auto join 3rd party Zigbee gateways which employ a conventional automatic joining procedure. A factory-new luminaire device implementing CJM always sends the predetermined message when triggered (e.g. with a torch light etc.). However, the predetermined message is ignored by the 3rd party gateway and by luminaire devices not implementing CJM.

The proposed joining procedure described in the embodiments is based on exchanging dedicated InterPAN messages (which are not rebroadcast or forwarded) and hence requires that the first luminaire device (L1) 10-1 is in single-hop proximity to hear the predetermined message from the second luminaire device (L2) 10-2. This however fits the point-and-select installer flow for standalone systems, where the installer per definition selects adjacent lights during installation.

Furthermore, the proposed commissioning approach is for instance well suited for gateway-free systems, as the installer does the network formation while physically standing in the same area as the lights. Hence, as the installer triggers a subsequent second luminaire device (e.g. light or lamp or the like), the predetermined message sent by the second luminaire device will be received by the previous first luminaire device (e.g. light or lamp or the like) without wireless range concerns.

According to a third embodiment, the proposed commissioning approach may as well be implemented in a lighting system which consists of at least one smart luminaire device (e.g. light bulb, lamp, etc.) and a gateway device (also referred to as bridge or hub) that is used as a Zigbee transceiver to communicate with the at least one luminaire device. The gateway device may connect to e.g. a home router via Ethernet or WiFi. The installer then starts the controlled joining method from the gateway device, which opens the network and commissions then one luminaire at a time outward from the gateway device based on the receipt of the predetermined messages.

Lighting control systems can use a variety of control models when in use, e.g. centralized control (where signals from switches and sensors are sent to a central node which decides on the lighting effects needed, and distributes those to the luminaire devices), and distributed control (where signals from switches and sensors (at least) are sent to luminaire devices in the vicinity of the switch/sensor, and those luminaire devices can decide on appropriate lighting effects based on the signals from the switch/sensor), or some combination or variation thereof. Thus, luminaire devices may need to be configured to use one of these methods. The trigger used in the above embodiments may also be used as input for configuring the lighting control method. For example, a device according to one of the above embodiments may use distributed control when it has received a trigger to use the controlled joining method, while the same device would use centralized control if it did not receive such a trigger.

To summarize, commissioning methods and apparatuses have been described, which can be used to provide controlled joining optionally combined with automatic joining in a wireless network with either gateway-based or gateway-free layout; also, it can be combined with centralized control as well as distributed control.

The proposed commissioning approach can equally be applied to any type of distributed or centralized wireless network (e.g. multi-hop or star-type networks) and other Zigbee devices such as switches, sensors, etc.

While the invention has been illustrated and described in detail in the drawings and foregoing description, such illustration and description are to be considered illustrative or exemplary and not restrictive. The invention is not limited to the disclosed embodiments. The described luminaire devices could be any type of networked device (e.g. switches, sensors, plugload controllers, etc.) in which a network joining procedure can be implemented. The proposed joining procedures can be applied to and possibly standardized in other types of wireless networks and with other types of messages. Moreover, the invention can be applied in any product that implements a wireless network (e.g. Zigbee or others). An example includes a large-scale Zigbee lighting network where single light-points are commissioned using a mobile device such as smartphone or tablet via BLE. Moreover, various user interfaces for commissioning with various types of input operations (e.g. hardware switches or buttons, audio control, flashlight control app-based smartphone control etc.) could be provided at the commissioning device or tool.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 2 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A luminaire device comprising an apparatus for controlling an addition of the luminaire device to a wireless network, wherein the apparatus comprises:
    a network admission control unit for controlling a first network joining process and a second network joining process of the luminaire device;
    a first network joining unit using an auto-joining mode for controlling the network admission control unit to apply the first network joining process to search for and try to join an open network if one has been found, and when the luminaire device receives a trigger from a commissioning tool, to send a predetermined message, which indicates a triggered state of the luminaire device;
    wherein the network admission control unit is adapted to switch from the first network joining unit to a second network joining unit for controlling the second network joining process and create and open a wireless network upon occurrence of one of the following conditions:
        the luminaire device fails to join the open network in the auto-joining mode after a predetermined time period; or
        the luminaire device receives a network control command or attribute for switching from the first network joining unit to the second network joining unit; and
    the second network joining unit using a controlled-joining mode for controlling the network admission control unit to apply the second network joining process in which a first network node is only admitted to the wireless network if a further predetermined message has been received from the first network node, wherein the further predetermined message indicates that the first network node has been triggered by the commissioning tool.

2. The luminaire device of claim 1, wherein the network admission control unit is adapted to create and open the wireless network if the trigger from the commissioning tool is repeated or if the trigger is combined with an additional condition.

3. The luminaire device of claim 1, wherein the network admission control unit is adapted to directly create and open the wireless network in response to the receipt of the further predetermined message by the luminaire device.

4. The luminaire device of claim 1, wherein each predetermined message is a network-independent message which is sent at least on a same channel as the wireless network to be joined and which contains some information that can be related to the device sending it.

5. The luminaire device of claim 1, wherein the network admission control unit is adapted to send a command or attribute to a newly added network node for instructing the newly added network node to employ the second network joining process.

6. The luminaire device of claim 1, wherein the network admission control unit is adapted to also admit a second network node to the wireless network without receipt of a predetermined message from the second network node, if a corresponding command dedicated to the second network node has been received.

7. A lighting system comprising at least one luminaire device as claimed in claim 1.

8. The luminaire device of claim 1, wherein the first network joining unit is configured to use the auto-joining mode for controlling the network admission control unit by default.

9. The luminaire device of claim 1, wherein the network is a Zigbee network and the predetermined message is sent as a single-hop interpersonal area network.

10. The luminaire device of claim 1, wherein the further predetermined message contains a unique identification of the first network node.

11. The luminaire device of claim 1, wherein the first network node is only admitted if the further predetermined message also includes a network joining request from the first network node.

12. A method of controlling an addition of a luminaire device to a wireless network, wherein the method comprises:
    in a first network joining mode being an auto-joining mode for controlling a first network joining process of the luminaire device, searching for and trying to join an open network if one has been found, and when the luminaire device receives a trigger from a commissioning tool, sending a predetermined message, which indicates a triggered state of the luminaire device;

switching from the first network joining mode to a second network joining mode for controlling a second network joining process of the luminaire device and creating and opening a wireless network upon occurrence of one of the following conditions:
   the luminaire device failing to join the open network in the auto-joining mode after a predetermined time period; or
   the luminaire device receiving a network control command or attribute for switching from the first network joining mode to the second network joining mode; and
in the second network joining mode being a controlled-joining mode, applying the second network joining process in which a first network node is admitted to the wireless network only if a further predetermined message has been received from the first network node, wherein the further predetermined message indicates that the first network node has been triggered by the commissioning tool.

13. A computer program product comprising non-transitory code means for producing the steps of claim 12 when run on a computer device.

14. The method of claim 12, wherein the switching step comprises creating and opening the wireless network if the trigger from the commissioning tool is repeated or if the trigger is combined with an additional condition.

15. The method of claim 12, wherein the switching step further comprises creating and opening the network in response to receiving the further predetermined message by the luminaire device.

16. The method of claim 12, wherein each predetermined message is a network-independent message which is sent at least on a same channel as the network to be joined and which contains some information that can be related to the device sending it.

17. The method of claim 12, wherein the step of controlling the first network joining process is by default upon switching on the luminaire device.

* * * * *